United States Patent
Brewer et al.

(10) Patent No.: US 7,240,225 B2
(45) Date of Patent: Jul. 3, 2007

(54) SYSTEM AND METHOD FOR THROTTLING POWER IN ONE OR MORE INFORMATION HANDLING SYSTEMS

(75) Inventors: James A. Brewer, Leander, TX (US); William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 10/705,600

(22) Filed: Nov. 10, 2003

(65) Prior Publication Data

US 2005/0102544 A1  May 12, 2005

(51) Int. Cl.
*G06F 1/00* (2006.01)

(52) U.S. Cl. .................. 713/300; 713/310; 713/340

(58) Field of Classification Search ............... 713/300, 713/310, 320, 324, 340
See application file for complete search history.

(56) References Cited

U.S. PATENT DOCUMENTS

| | | | |
|---|---|---|---|
| 4,181,950 A | 1/1980 | Carter, II | 364/492 |
| 4,347,575 A | 8/1982 | Gurr et al. | 364/492 |
| 5,486,726 A | 1/1996 | Kim et al. | 307/120 |
| 5,504,907 A | 4/1996 | Stewart et al. | 395/750 |
| 5,664,202 A | 9/1997 | Chen et al. | 395/750.08 |
| 5,842,027 A * | 11/1998 | Oprescu et al. | 713/300 |
| 5,996,084 A | 11/1999 | Watts | 713/323 |
| 6,229,432 B1 | 5/2001 | Fridley et al. | 340/310.01 |
| 6,367,023 B2 * | 4/2002 | Kling et al. | 713/340 |
| 6,400,103 B1 | 6/2002 | Adamson | 315/292 |
| 6,721,672 B2 * | 4/2004 | Spitaels et al. | 702/62 |
| 2002/0062454 A1 | 5/2002 | Fung | 713/300 |
| 2002/0104031 A1 * | 8/2002 | Tomlinson et al. | 713/320 |
| 2003/0004660 A1 | 1/2003 | Hunter | 702/61 |
| 2004/0148060 A1 * | 7/2004 | Lee | 700/295 |

* cited by examiner

*Primary Examiner*—Thomas Lee
*Assistant Examiner*—Mark Connolly
(74) *Attorney, Agent, or Firm*—Baker Botts L.L.P.

(57) ABSTRACT

An information handling system includes support for dynamic power throttling. In one embodiment, an information handling system includes power level detection and power control modules. The power level detection module may monitor power consumption for the information handling system and may automatically transmit power level data to a power level manager, based on the monitored power consumption. The power control module may receive power control data from the power level manager. The power control module may also automatically adjust power consumption of the information handling system, in accordance with the power control data received from the power level manager. In another embodiment, an information handling system may include an interface and a power level manager. The power level manager may receive power information for computers via the interface, may automatically compute an adjusted power threshold setting, and may automatically transmit the adjusted power threshold setting to a computer.

20 Claims, 3 Drawing Sheets

SYSTEM AND METHOD FOR THROTTLING POWER IN ONE OR MORE INFORMATION HANDLING SYSTEMS

TECHNICAL FIELD

The present disclosure relates in general to information handling systems. In particular, the present disclosure relates to systems and methods for throttling power in one or more information handling systems.

BACKGROUND

As the value and use of information continues to increase, individuals and businesses seek additional ways to process and store information. The options available to users include information handling systems. An information handling system generally processes, compiles, stores, and/or communicates information or data for business personal, or other purposes, thereby allowing users to take advantage of the value of the information. Because technology and information handling needs and requirements vary between different users or applications, information handling systems may also vary regarding what information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As technology has progressed, power consumption in information handling systems such as the typical personal computer (PC) or server has increased rapidly. Within the near future, a high-performance desktop system may require more power than is available from a 15 or 20 amp alternating current (AC) wall circuit. Increased power consumption typically also causes increased heat generation, which may exceed the capacity of present air conditioning systems. Increased power consumption may also correlate to increased noise generation. Furthermore, the use of multiple information handling systems within the same area is becoming more common. For instance, several PCs may be deployed in the same room to be used by different people, or many servers may be deployed on the same server rack to work together, for example as a data processing cluster or a distributed information handling system. Increasing the concentration of systems may multiply the challenges described above, with regard to the provision of adequate power and cooling and the management of noise levels.

SUMMARY

The present disclosure describes one or more example embodiments of systems with support for dynamic power throttling. According to one embodiment, an information handling system includes a power level detection module and a power control module. The power level detection module may monitor power consumption for the information handling system and may automatically transmit power level data to a power level manager, based on the monitored power consumption. The power control module may receive power control data from the power level manager. The power control module may also automatically adjust power consumption of the information handling system, in accordance with the power control data received from the power level manager.

According to another embodiment, an information handling system may include an interface operable to communicate with multiple computers. The information handling system may also include a power level manager in communication with the interface. The power level manager may receive power information for the computers via the interface. The power information may include data on power consumption for individual computers, monitored by power level detection modules associated with the computers, for instance. In response to receiving the power information, the power level manager may automatically compute an adjusted power threshold setting for a computer. In response to computing the adjusted power threshold setting, the power level manager may automatically transmit the adjusted power threshold setting to a power control module for that computer. The adjusted power threshold setting may cause the computer to adjust its power consumption. Additional embodiments pertain to related methods and software for managing power consumption.

BRIEF DESCRIPTION OF THE DRAWINGS

A more complete understanding of various embodiments and advantages thereof may be acquired by referring to the following description taken in conjunction with the accompanying drawings, in which.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, and a video display. The information handling system may also include one or more buses operable to transmit communications between the various hardware components. Thus, the types of systems that may be referred to as information handling systems include, without limitation, individual devices such as PCs, as well as collections of components that cooperate to handle data, such as an aggregation of servers.

Methods, systems, and software according to the present disclosure may be used to reduce power consumption, reduce noise, and reduce the load on air conditioning systems in environments that include one or more information handling systems. The benefits of such methods and systems may be further appreciated as changes in technology, deployment practices, or both might otherwise tax or exceed the capacity of any particular environment to provide adequate power and cooling for a desired deployment of information handling systems.

Figure 1:
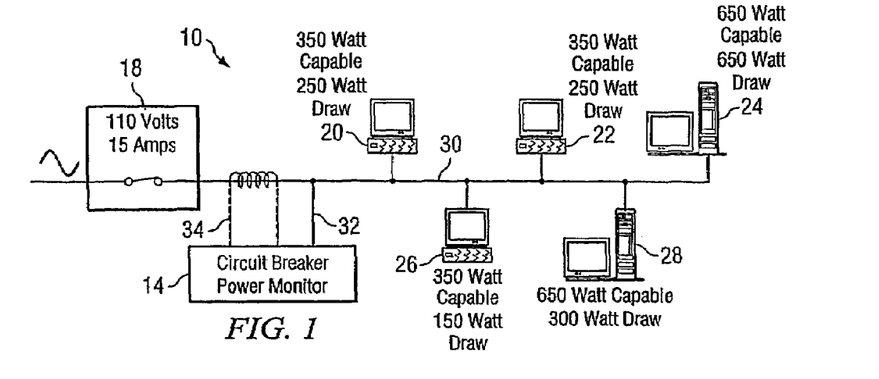
FIG. 1 depicts a block diagram of an example embodiment of in information handling system with support for power throttling according to the present disclosure.

Preferred embodiments according to the present disclosure and their advantages may be understood by reference to FIGS. 1 through 6. FIG. 1 depicts a block diagram of an example embodiment of an information handling system 10 with support for power throttling according to the present disclosure. Information handling system 10 contains an aggregation of computers 20, 22, 24, 26, 28 that all draw power from a shared circuit breaker 18 via power line 30. As illustrated, if allowed to operate at full power, computers 20, 22, and 26 would each consume 350 watts, and computers 24 and 28 would each consume 650 watts, for an aggregate power consumption of 2350 watts for the whole group. However, since circuit breaker 18 passes alternating current (AC) at 110 volts and is designed with a trip point of 15 amps, the maximum capacity of circuit breaker 18 is 1650 watts. The available power therefore would not be adequate to power computers 20–28 at full power.

According to the present disclosure, centralized power management may be used to allow computers 20–28 to all operate simultaneously while powered from power line 30. In a typical usage scenario, only a few of the systems in the group will be very busy, while many other systems may be relatively unoccupied. A disclosed approach to power management may throttle power consumption in one or more selected computers, to allow computers 20–28 to peacefully coexist under the power limit of power line 30.

The present disclosure includes an embodiment in which a circuit breaker power monitor (CBPM) 14 monitors power line 30 via meter line 34 to detect the amount of power being pulled through circuit breaker 18. In addition, CBPM 14 may determine how much power each system should be using, based on user settings or administrative preferences, for example. CBPM 14 may transmit power control information to computers 20–28, for example via communication line 32 and power line 30. Accordingly, computers 20–28 may be referred to collectively as a control group. In response to receiving the power control information, the computers in the control group may regulate their individual levels of power consumption according to the power control information, for example in a manner similar to that described below in connection with FIG. 5. In alternative embodiments, aggregate power consumption may be monitored by devices at different levels, such as the wall outlet level, the floor level, or the building level.

Alternatively, one of the computers may operate as the power manager or master, controlling the power consumption of one, some, or all of computers 20–28. For instance, within the control group, computer 24 may operate as the master system, and computers 20, 22, 26, and 28 may operate as slaves, with regard to power control. In a disclosed embodiment, computer 24 may operate as both master and slave. In various embodiments, power consumption for each of computers 20–28 may be detected by the computers themselves.

Figure 2:
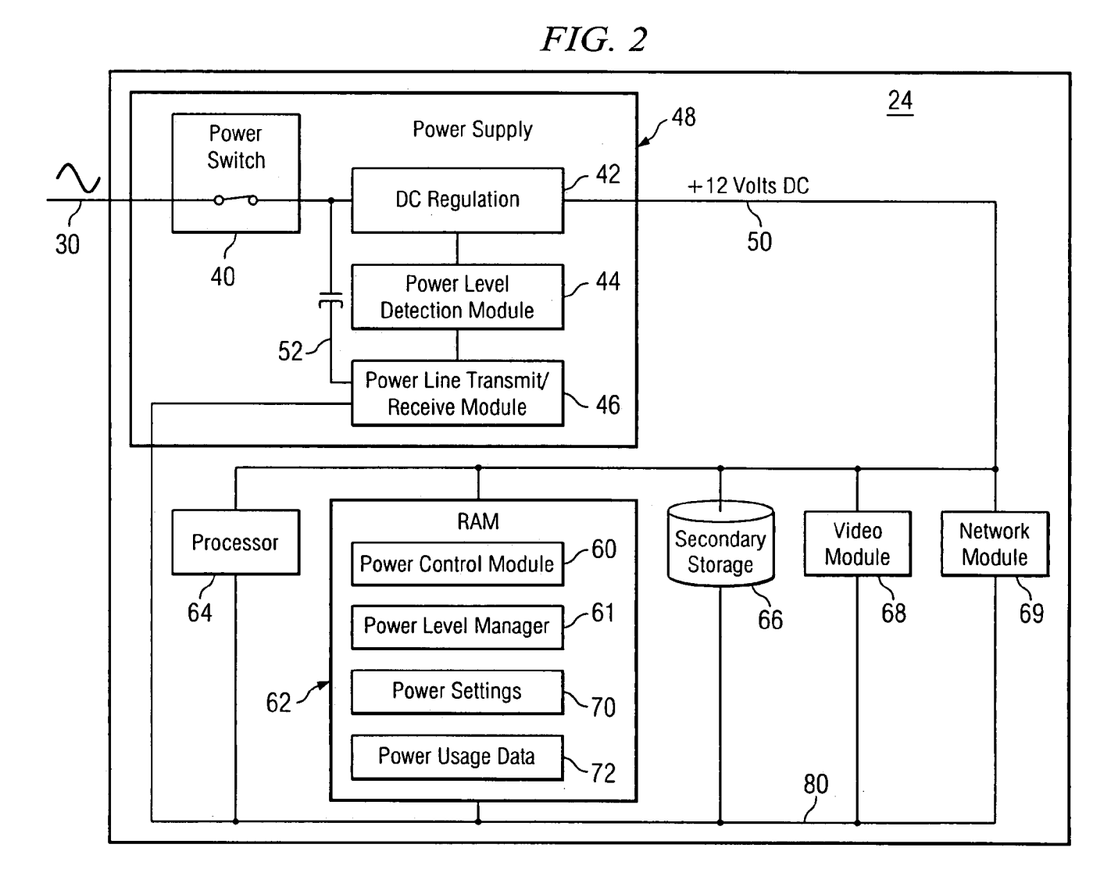
FIG. 2 illustrates a block diagram of an example computer from the diagram of FIG. 1 in greater detail.

FIG. 2 illustrates a block diagram of master system 24 from FIG. 1 in greater detail. Master system 24 may include a power supply 48 with a power switch 40 that receives AC from power line 30. Power supply 48 may also include a direct current (DC) regulator 42 that receives the AC and produces DC for use within master system 24. For example, DC regulator 42 may provide 12 volts DC to a power conductor 50 within master system 24. Power supply 48 may also provide other levels of DC power to other power conductors within master system 24. Power conductors 50 may be implemented within system buses, and they may also be carried in cables.

Power supply 48 may also include a power level detection module (PLDM) 44 in communication with DC regulator 42. PLDM 44 may detect the total amount of power being consumed from power supply 48 by master system 24. Power supply 48 may also include a power line transmit/receive module (PLTRM) 46 that receives information from PLDM 44 specifying a present level of power consumption, converts that information into another format, and transmits the converted information to external devices via power line 30. For instance, PLTRM 46 may transmit power information, such as power and throttle levels, to power line 30 via link 52. PLTRM 46 may also receive information such as power control data from power line 30. PLTRM 46 may also be referred to as a power line data interface or simply an interface.

In addition or alternatively to using power line communications, information from PLDM 44 may be transmitted or received via standard network mechanisms, such as network module 69. Network technologies that may be used for transmitting and receiving power information include, without limitation, wired or wireless technologies, which may use any suitable protocol, such as Ethernet, 802.11, and Bluetooth, for example.

As described in greater detail below, the power information and the power control data may be encoded in data structures such as slave power packets and master power packets, respectively. Computers 20, 22, 26, and 28 may include power supplies with the same or similar components.

In addition, master system 24 includes various hardware components for processing data, such as one or more processors 64, memory such as random access memory (RAM) 62, secondary data storage such as a hard disk drive 66, and input/output (I/O) components such as a keyboard interface, a mouse interface, and a video module 68. These hardware components may communicate with each other via one or more system buses 80. These hardware components may also obtain DC power from power supply 48 via power conductor 50. System bus 80 may also interconnect PLTRM 46 with hardware components such as processor 64.

In the illustrated embodiment, master system 24 also includes software for managing its own power consumption, as well as the power consumption of other computers. For example, processor 64 may execute a control module program 60 from RAM 62, to perform operations that include preventing master system 24 from consuming power in excess of a predetermined limit. Control module program 60 may also be referred to as power control module 60.

Information describing the present power limits and present power usage may be stored as power settings 70 and power usage data 72, respectively. Processor 64 may also execute a global power level management program 61 from RAM 62, to perform operations that include monitoring the aggregate power consumption of the computers within the control group and managing the power consumption of the computers within the group to particular limits. Slave systems 20, 22, 26, and 28 may also include a power control module, as well as associated power level settings and power usage data.

Master system 24 and slave systems 20–28 may adjust power consumption by throttling subsystems. The subsystems to be throttled may be based on factors such as user preferences, running applications, internal system temperature, and external or inlet temperatures.

Figure 3:
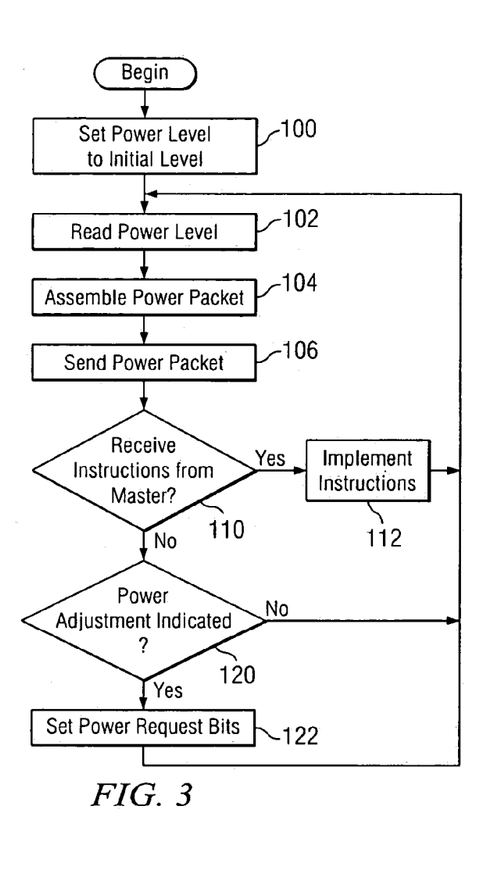
FIG. 3 depicts a flowchart of an example embodiment of a method for managing power in an information handling system according to the present disclosure.

FIG. 3 depicts a flowchart of an example embodiment of a method for managing power in an information handling system according to the present disclosure. In general, as described in greater detail below, information handling systems such as computers 20–28 may support dynamic power throttling. For instance, computer 20 may use a PLDM to monitor its own power consumption, and may automatically transmit power level data to a power level manager in computer 24, to apprise the power level manager of the present power consumption of computer 20. Computer 24 may process the power level data and generate power control data to manage power consumption. Computer 20 may receive the power control data from the power level manager, and, in response automatically adjust the power consumption of computer 20, in accordance with the power control data. Computer 20 may thus operate as a slave system.

Computer 24 may operate as both a slave system and a master system. In the role of slave, computer 24 may report its power consumption to power level manager 61, may request permission for power adjustments from power level manager 61, and may respond to instructions from power level manager 61 to implement specified power adjustment, for example. In the role of master, computer 24 may host power level manager 61, which may control the power consumption of each of computers 20–18.

The example process of FIG. 3 starts with the initiation of a boot process in an information handling system. For purposes of illustration, the process will be described primarily with reference to computer 24, which is also the subject of FIG. 2. However, the same process or a similar one may as well be executed by corresponding components within computers 20, 22, 26, and 28.

As part of the boot process or at the completion of the boot process, power control module 60 in computer 24 may set the power level or throttle setting of computer 24 to a predetermined default setting, as depicted at block 100. For instance, power control module 60 may update a table of power settings 70 to set the current power level or throttle setting to high for computer 24. Similarly, computers 26 and 28 may be configured to default to a throttle setting of low, and computers 20 and 22 may default to a throttle setting of medium. A high throttle setting may cause a computer to operate at full power. The medium and low throttle settings for each computer may cause one or more components of that computer to operate in a reduced power mode. In addition or alternatively, the throttle setting or power setting for each computer may include a specified limit on power consumption. The power control modules may automatically regulate the power consumption in each system, in accordance with the throttle setting or power limit.

For instance, the frequency of the clock for the central processor may be increased or decreased (i.e., adjusted), the frequency of the clock for a graphics processor in a video subsystem may be adjusted, and/or any other suitable power reduction or power management responses may be implemented. The exact response in any specific computer to any particular power setting may be guided by user preferences, by settings configured onsite by an administrator, by a configuration set at the factory before the computer was shipped to the customer, or by any other suitable method. Similarly, the default power setting may be specified in any suitable manner, including the mechanisms described above. These default power settings may also include a power priority setting, to be used in mediating competing requests for power, as described in greater detail below.

When ordering a group of information handling systems such as computers 20–28, the customer could specify that the intended deployment environment will include computer 24 acting as the master system, and computers 20, 22, 26, and 28 acting as slave systems, with regard to power control. The customer could further specify an aggregate limit for the power line to be shared by computers 20–28, for instance-as a breaker with a 15 amp trip point on a 110 volt line. The customer could also specify specific default power limits for each of computers 20–28, or the manufacturer could determine default power limits, based on the provided information about the deployment environment. The manufacturer could set or store power settings such as the default limits, the power priority settings, the minimum and maximum margins for triggering requests for power adjustments, and other settings in computers 20–28 during the manufacturing process, before shipping computers 20–28 to the customer.

As shown at block 102, after the default throttle setting has been set or activated, PLDM 44 in computer 24 may detect the present level of power consumption within computer 24. Power control module 60 may receive this measurement from the PLDM and record it as power usage data 72.

Power control module 60 can request a power reading from any of slave computers 20–28 via the PLTRM 46, network module 69, or any other suitable communication mechanism. The slave computer which receives the request may read its power consumption via a mechanism like PLDM 44, package it in a manner described below, and transmit it via one of the described communications mechanisms to master computer 24. The master computer 24 using its power control module 60 may enter the data for the slave in the power usage data table 72 of master computer 24.

As shown at blocks 104 and 106, PLTRM 46 may also assemble a slave power packet that encodes the detected level of power consumption, and may transmit that slave power packet to power level manager 61. For slave systems 20, 22, 26, and 28, their PLTRMs may transmit slave power packets to power level manager 61 within master system 24 via power line 30. The slave power packets generated by master system 24 may be also be transmitted via power line 30, or they may be communicated directly to power level manager 61 via system bus 80.

Figure 5:
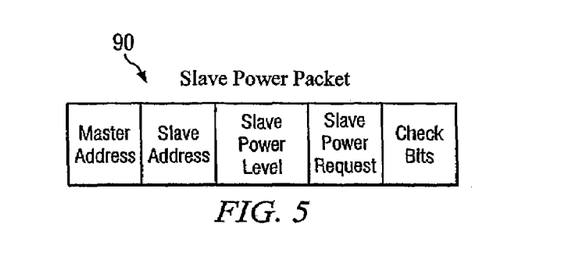
FIG. 5 depicts a generalized block diagram of an example slave communication packet according to the present disclosure.

FIG. 5 depicts a generalized block diagram of an example slave power packet 90 according to the present disclosure. Slave power packets may also be referred to as slave communication packets. As illustrated, slave power packets 90 may include various fields for different types of data. For instance, one field may be a master address field, for identifying the master system to receive and process the power packet. Another field may be a slave address to identify the particular system that generated the power packet. Additional fields may include a slave power level field for reporting the present level of power consumption to the master system, and a slave power request field. The slave power request field may be used to transmit requests for modification of the current throttle setting. For instance, as described in greater detail below, a slave system may automatically request permission from the master system to increase power consumption or to decrease power consumption, in response to changing needs for power within the slave system. A field may also be used for check bits to verify packet integrity.

At block 110, power control module 60 may determine whether a master power packet has been received from power level manager 61. For slave systems 20, 22, 26, and 28, their PLTRMs may receive master power packets via power line 30 or a mechanism like network module 69. Power control module 61 may transmit master power packets to power control module 60 within master system 24 via power line 30 or directly via system bus 80.

Figure 6:
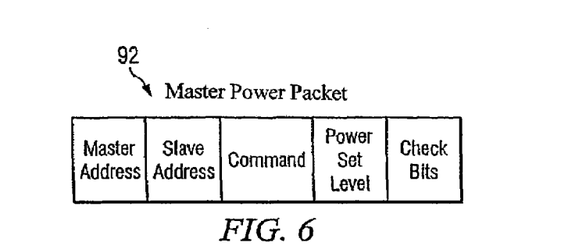
FIG. 6 depicts a generalized block diagram of an example master communication packet according to the present disclosure.

FIG. 6 depicts a generalized block diagram of an example master power packet 92 according to the present disclosure. Master power packets may also be referred to as master communication packets. As illustrated, master power packets 92 may also include various fields, such as master address and slave address for identifying the packet's sender and intended recipient, respectively. Master power packets 92 may also include power management instructions to be processed by the intended recipient system. For instance, a command field may contain data instructing a slave computer to report the present level of power consumption, or data instructing the slave computer to alter its throttle setting or to restrict power consumption to a specified level or threshold.

Referring again to FIG. 3, if a master power packet has not been received, as depicted at block 120, power control module 60 may determine whether a power adjustment would be suitable for system 24. For instance, this determination may be made based on a comparison of an established power consumption limit and the detected level of actual power consumption. In one embodiment, one or more registers may be used to monitor changes in power consumption, and a system management interrupt (SMI) may be triggered automatically whenever a change in power consumption exceeds a predetermined level.

If the actual power consumption is approaching or within a predetermined minimum margin from the power consumption limit, a request for increased power may be generated. For instance, referring again to FIG. 1, the process of FIG. 3 may be executed by slave system 20. If the established power limit in slave system 20 is 250 watts, and the actual power consumption is within 50 watts of that limit, the power control module within slave system 20 may automatically transmit a request to master system 24 for approval to increase the power limit. The power control module may use the PLTRM within slave system 20 to transmit that request.

On the other hand, if the actual power consumption is outside a predetermined maximum margin from the power consumption limit, a request for decreased power may be generated. For instance, the power control module in slave system 20 may generate a decrease request if actual power consumption is more than 100 watts less than the power consumption limit.

In an alternative embodiment, a power level manager may perform one or more of the comparisons involving the actual consumption and the predetermined limit, and may automatically instruct a slave system to decrease power, for instance, based on actual consumption being less than the present power limit for that system, minus the maximum margin. In alternative embodiments, a slave system may automatically reduce its own threshold when the margin between actual consumption and the present threshold exceed a certain amount, and the slave system may report the new power limit to the master system.

Referring again to a context in which computer 24 is executing the process of FIG. 3, as shown at block 122, if power control module 61 determines that a power adjustment would be suitable for computer 24, a power request is added to a slave power packet. The process may then return to block 102, with PLDM 44 reading the present level of power consumption. That information may then be added to the slave power packet, and the power packet transmitted to power level manager 61, as illustrated at blocks 104 and 106.

However, returning to block 110, if power control module 60 determines that a master power packet with power instructions has been received from power level manager 61, power control module 112 implements the instructions, as shown at block 112. For instance, if the instructions specify a new power consumption limit, power control module 60 may update power settings 70, and, as described above, may adjust the power consumption of computer 24 accordingly, if necessary. Slave computers thus may be said to self-manage their power against the specified threshold. The process may then return to block 102, with computer 24 monitoring power consumption, transmitting power requests, and responding to power instructions, basically as described above.

Figure 4:
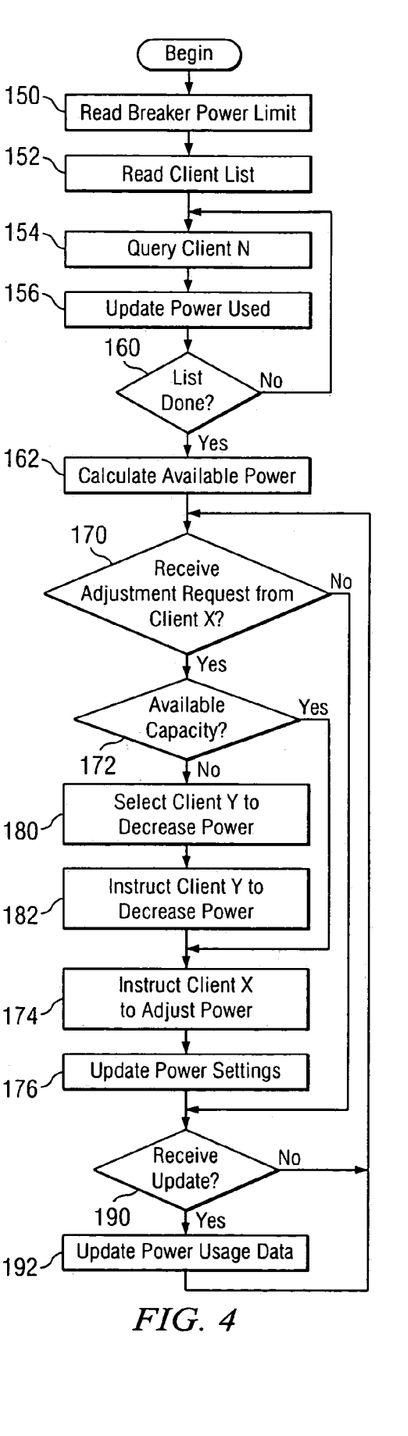
FIG. 4 depicts a flowchart of an example embodiment of a method for managing power for a group of information handling systems according to the present disclosure.

FIG. 4 depicts a flowchart of an example embodiment of a method for managing power for a group of information handling systems according to the present disclosure. For instance, the disclosed method may be used to manage the aggregation of computers 20–28 in information handling system 10, as depicted in FIG. 1. In particular, the disclosed method may be executed by an information handling system such as computer 24, to dynamically throttle power consumption of computers 20–28. As depicted in FIGS. 1 and 2, master system 24, may include an interface such as PLTRM 46 that power level manager 61 uses to communicate with PLDMs and power control modules in each of computers 20–28.

The method of FIG. 4 may begin with master system 24 booting up and executing an initialization process for PLDM 44, PLTRM 46, power settings 70, and power usage 72, as described above. At block 150, power level manager 61 may determine and store an aggregate power limit or threshold for computers 20–28, for instance based on a pre-configured limit or based on data obtained dynamically from a device such as circuit breaker 18 or circuit breaker power monitor 14. As shown at block 152, power level manager 61 may also determine which slave systems are to be managed. For instance, power level manager 61 may retrieve from power settings 70 a list of the systems to be managed.

As shown starting at block 154, power level manager 61 may then begin an iterative process of querying each of those slave systems (e.g., slave systems 20–28), to learn to present power usage of each slave system. For instance, as described above, power level manager 61 within master system 24 may obtain power information from power level detection modules in computers 20–28. Also, as depicted at block 156, power level manager 61 may update power usage data 72 to record the information learned in this process. Once each of the systems has provided power level manager 61 with present power usage data, the process may proceed from block 160 to block 162. As depicted at block 162, power level manager 61 may then calculate the available power by subtracting the total power being used from the aggregate limit for power consumption.

As shown at block 170, power level manager 61 may then determine whether it has received a power request asking for permission to implement a power adjustment. In response to receiving such a request, power level manager 61 may determine whether circuit breaker 18 has available capacity to support the requested power adjustment, as shown at block 172. For instance, power level manager 61 may automatically and dynamically calculate an aggregate power consumption for the information handling systems, based on the individual power consumption levels. If capacity is available to accommodate the request, power level manager 61 transmits a master power packet to the requesting system, instructing that system to adjust its power settings in accordance with the requested adjustment, as depicted at block 174. Power level manager 61 may then update power settings 70 for the requesting system, as shown at block 176. This update to the power settings maintained by master system 24 may be in addition to any settings that may be updated within the selected system itself in response to receiving the instructions from master system 24.

However, referring again to block 172, if it is determined that aggregate power consumption for the information handling systems approaches the aggregate power limit, for instance because insufficient capacity remains to accommodate the request, the process passes to block 180. Power level manager 61 may then consult a schedule of power priorities for the managed systems, and may select one or more particular systems for power reduction, based on the relative power priorities of that system and the system requesting more power. If the requesting system (e.g., slave system 20) has a higher power priority than another system (e.g., slave system 26), power level manager 61 may automatically compute a reduced power limit for slave system 26 and automatically transmit the reduced power limit or threshold setting to the power control module for slave system 26, as depicted at block 182. If no priorities are associated with the systems, or if all priorities are the same, power level manager 61 may select the system or multiple systems for power reduction in a manner designed to provide approximately equal amounts of power to each competing system. Thus, in response to determining that the aggregate power consumption approaches the aggregate power limit, power level manager 61 may automatically communicate with one or more selected information handling systems to cause the selected information handling system or systems to reduce power consumption.

Once sufficient capacity has been made available, power level manager 61 may transmit instructions to the requesting system to grant permission for the requested increase, and may update data pertaining to the requesting system in the table or record of power settings, as shown at blocks 174 and 176 and described above. In alternative embodiments, different calculations and comparisons may be made when processing or mediating competing requests for power.

Once power level manager 61 has processed the request for power adjustment, or if it is determined at block 170 that no request has been received, power level manager 61 may determine whether it has received a slave power packet with an update regarding the power consumption of one of computers 20–28, as depicted at block 190. For instance, such a slave power packet may be a separate slave power packet from a slave power packet requesting power adjustment, or it may be a slave power packet with a request that was just processed. If a power update was received, power level manager 61 may update power usage data 72 pertaining to the system that sent the update, as shown at block 192. Once power level manager 61 has updated power usage data 72, or if it is determined at block 190 that no power update was received, the process may return to block 170. Master system 24 may then continue to process requests and updates as described above.

In alternative embodiments, individual systems may manage their power based on a maximum threshold for each system, in terms of AC power and/or current, for example. Such a system may monitor the power it is drawing from the wall and may manage its own subsystems according to the set threshold. The threshold could be set statically or dynamically based on, for example, detection of attached peripherals, geographic location site-specific information, and/or other parameters. The threshold could be hand entered, set by an administrator via a network connection, or through other support tools.

Alternative embodiments also include implementations in which a power level manager monitors individual power consumption levels for a slave system by reading power information from one or more devices within the slave system. For example, the power level manager 61 may read the power information by obtaining extended display identification data from the device or devices. Also, communications such as master and slave power packets may be transmitted using different transmission media, such as wired or wireless network connections, in alternative embodiments. For instance, the types of network connections used may include, without limitation, 802.11, BLUETOOTH, and Ethernet.

The disclosed embodiments or alternative embodiment may also be used to manage a selected group of computers on a set of circuit breakers, a selected set of computers within a room, a selected set of computers within a floor of a building, or a selected set of computers within a building (such as all of the computers in the building).

In addition, it should be understood that references herein to characteristics and operations such as power, measurements of power usage, and transmission of power information are intended to include components of power, such as voltage and current. For instance, AC voltage may be known, current may be measured, information regarding the measured current may be transmitted, and power may be calculated, based on the known voltage and measured current. For example, at a breaker, current may be measured with a very small, precision, high power resistor in the circuit, such as a 0.1 ohm resistor. Voltage drop across the resistor may be measured and used to calculate the current. Alternatively or in addition, a coil may be installed around the conductor coming out of the circuit breaker. The magnetic field of the conductor may induce a current within the coil, and that current may be measured and used to calculate the current in the conductor.

For a particular deployment, power level detection modules may be implemented as current level detection modules, for example. There are many different ways that current flow may be measured, without regard to voltage and resistance. For example, a current level detection module may include a mechanism that uses thermal, magnetic, or possibly other physical effects. For instance, thermal expansion of a bimetal element may cause a switch to trip or a signal to be generated, or an electromagnet and armature may be used, with high current causing the electromagnet to attract the armature to trip a switch or cause a signal to be generated. The system may keep the aggregate current on a circuit below the breaker threshold, based on information from current level detection modules in one or more computers. The system may thus manage power line draw to preventing circuit breakers from tripping, by monitoring current and independent of power.

Although one or more embodiments have been described in detail, it should be understood that various changes, substitutions and alterations can be made to the embodiments without departing from their spirit and scope. For example, one of ordinary skill in the art will appreciate that alternative embodiments could be deployed with many variations in the number and type of systems or devices in the network, the network protocols, the system or network topology, the distribution of various software and data components among the systems in the network, and myriad other details without departing from the spirit and scope of the present disclosure.

Alternative embodiments may include a single system that manages power consumption based on a manually entered current limit.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. For instance, each component such as PLDMs, PLTRMs, power control modules, and power level managers may be implemented partially or completely as hardware, as part of a basic input/output system (BIOS), as part of an operating system (OS), or as an application.

Although various components have been illustrated as separate hardware or software components, in alternative embodiments, one or more components could be combined, or individual components could be divided into separate components. For instance, an alternative embodiment may include a computer with a system power monitor/control module that detects the power consumption level for the computer and also regulates the power consumption of the computer, based on a static or dynamic power threshold setting. In alternative embodiments, information handling systems incorporating the invention may include personal computers, mini computers, mainframe computers, distributed computing systems, and other suitable devices.

Alternative embodiments also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such as wires, optical fibers, microwaves, radio waves, and other electromagnetic or optical carriers. The control logic may also be referred to as a program product.

Many other aspects of the disclosed embodiment may also be changed in alternative embodiments without departing from the scope and spirit of the invention. The scope of the invention is therefore not limited to the particulars of the embodiments or implementations illustrated herein, but is defined by the appended claims.

What is claimed is:

1. A method of controlling power consumption of a group of information handling systems that use a common power source, the method comprising:

storing an aggregate power limit for a group of information handling systems, the storing comprising storing trip point data that corresponds to a current trip point for a shared circuit breaker;

monitoring individual power consumption levels for the information handling systems, the monitoring comprising monitoring computers that draw power from the shared circuit breaker;

automatically calculating an aggregate power consumption for the group of information handling systems, based on the individual power consumption levels;

automatically determining whether the aggregate power consumption for the group of information handling systems approaches the aggregate power limit;

in response to determining that the aggregate power consumption approaches the aggregate power limit, automatically selecting at least one information handling system among the group for power reduction; and in response to determining that the aggregate power consumption approaches the aggregate power limit, automatically communicating with the selected information handling system to cause the selected information handling system to reduce power consumption.

2. A method according to claim 1, wherein the operation of monitoring individual power consumption levels for the information handling systems comprises:

receiving power information from the information handling systems via a power line.

3. A method according to claim 2, wherein the power line that carries the power information comprises a conductor that provides power from the circuit breaker to the information handling systems.

4. A method according to claim 1, wherein the operation of automatically communicating with the selected information handling system to cause the selected information handling system to reduce power consumption comprises:

communicating with the selected information handling system via a power line.

5. A method according to claim 1, wherein the operation of monitoring individual power consumption levels for the information handling systems comprises:

receiving power information reported from a power level detection module within each of the information handling systems.

6. A method according to claim 1, wherein the operation of monitoring individual power consumption levels for the information handling systems comprises:

reading power information from at least one device within at least one of the information handling systems.

7. A method according to claim 6, wherein the operation of reading power information from at least one device within at least one of the information handling systems comprises:

obtaining extended display identification data from the device.

8. A method according to claim 1, further comprising:

storing a power limit for at least one of the information handling systems in the at least one information handling system during a manufacturing process, before shipping the at least one information handling system to a customer.

9. A method according to claim 1, further comprising:

storing a power priority setting for at least one of the information handling systems in the at least one information handling system, during a manufacturing process, based on information provided by a customer, before shipping the at least one information handling system to the customer.

10. A method according to claim 1, further comprising:
storing individual power limits for the information handling systems in the information handling systems during a manufacturing process, based on information regarding a deployment environment for the information handling systems, before shipping the information handling systems to a customer; and
storing individual power priority settings for the information handling systems in the information handling system, during a manufacturing process, based on information regarding the deployment environment for the information handling systems, before shipping the information handling systems to the customer.

11. A method according to claim 1, wherein the operation of monitoring individual power consumption levels for multiple information handling systems comprises:
receiving a slave power packet from at least one of the information handling systems, the slave power packet including a request for permission to modify power consumption.

12. A method according to claim 11, wherein the operation of automatically and dynamically determining whether the aggregate power consumption approaches the aggregate power limit comprises:
determining whether the request for permission to modify power consumption, if granted, would exceed the aggregate power limit.

13. An information handling system with support for dynamic power throttling, the information handling system comprising:
multiple slave computers that draw power from a shared circuit breaker having a predetermined trip point, each slave computer containing a power level detection module and a power control module; and
a master computer containing a power level manager, wherein the master computer automatically and dynamically adjusts power thresholds for each of the slave computers, to prevent the slave computers from exceeding the trip point of the shared circuit breaker;
wherein each of the power level detection modules is operable to communicate with a power level manager; and
wherein the power control module is operable to communicate with the power level manager, wherein:
the power level detection modules monitor power consumption for the information handling system;
the information handling system automatically transmits power level data to the power level manager, based on the monitored power consumption;
the power control module receives power control data from the power level manager; and
the power control module automatically adjusts power consumption of the information handling system, in accordance with the power control data received from the power level manager.

14. An information handling system according to claim 13, wherein the power control data comprises a power threshold setting.

15. An information handling system according to claim 13, further comprising:
a power supply that converts alternating current to direct current; and
wherein the power level detection module resides within the power supply.

16. An information handling system according to claim 13, further comprising:

a power line data interface in communication with a power line; and
wherein the power control module receives the power control data from the power level manager via the power line data interface.

17. An information handling system according to claim 16, further comprising:
a power supply that converts alternating current from a source of electricity to direct current; and
wherein the power line data interface resides within the power supply.

18. A method for dynamically throttling current draw of computers on a common circuit, the method comprising:
receiving current information from current level detection modules of multiple computers on a common circuit;
in response to receiving the current information, automatically computing an adjusted current threshold setting for at least one of the computers;
in response to computing the adjusted current threshold setting, automatically transmitting the adjusted current threshold setting to a current control module for the at least one computer;
automatically determining whether an aggregate current draw of the multiple computers approaches a breaker threshold for a breaker on the common circuit; and
if the aggregate current draw approaches the breaker threshold, automatically transmitting the adjusted current threshold setting to at least one of the computers, to prevent the aggregate current draw of the multiple computers from exceeding the breaker threshold.

19. A method of controlling power consumption of a group of information handling systems that use a common power source, the method comprising:
storing an aggregate power limit for a group of information handling systems;
monitoring individual power consumption levels for the information handling systems including reading power information from at least one device within at least one of the information handling systems;
automatically calculating an aggregate power consumption for the group of information handling systems, based on the individual power consumption levels;
automatically determining whether the aggregate power consumption for the group of information handling systems approaches the aggregate power limit;
in response to determining that the aggregate power consumption approaches the aggregate power limit, automatically selecting at least one information handling system among the group for power reduction; and
in response to determining that the aggregate power consumption approaches the aggregate power limit, automatically communicating with the selected information handling system to cause the selected information handling system to reduce power consumption.

20. An information handling system with support for dynamic power throttling, the information handling system comprising:
a power level detection module operable to communicate with a power level manager;
a power line data interface in communication with a power line; and
a power control module operable to communicate with the power level manager, wherein:
the power level detection module monitors power consumption for the information handling system;

the information handling system automatically transmits power level data to the power level manager, based on the monitored power consumption;

the power control module receives power control data from the power level manager via the power line data interface; and the power control module automatically adjusts power consumption of the information handling system, in accordance with the power control data received from the power level manager.

* * * * *